(12) United States Patent
Elfström et al.

(10) Patent No.: US 12,604,220 B2
(45) Date of Patent: Apr. 14, 2026

(54) OTA ESTIMATION OF AN RF PARAMETER OF A RADIO TRANSMITTER

(71) Applicant: Telefonaktiebolaget LM Ericsson (publ), Stockholm (SE)

(72) Inventors: Torbjörn Elfström, Fjärås (SE); Jonas Fridén, Mölndal (SE); Aidin Razavi, Gothenburg (SE); Sam Agneessens, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 656 days.

(21) Appl. No.: 18/002,408

(22) PCT Filed: Jun. 23, 2020

(86) PCT No.: PCT/EP2020/067543
§ 371 (c)(1),
(2) Date: Dec. 19, 2022

(87) PCT Pub. No.: WO2021/259457
PCT Pub. Date: Dec. 30, 2021

(65) Prior Publication Data
US 2023/0232258 A1     Jul. 20, 2023

(51) Int. Cl.
| | |
|---|---|
| *H04L 5/00* | (2006.01) |
| *H04B 7/06* | (2006.01) |
| *H04B 17/18* | (2015.01) |
| *H04W 24/08* | (2009.01) |
| *H04W 72/12* | (2023.01) |

(52) U.S. Cl.
CPC ........ *H04W 24/08* (2013.01); *H04B 7/06952* (2023.05); *H04B 17/18* (2015.01);
(Continued)

(58) Field of Classification Search
CPC ...... H04W 24/08; H04W 72/12; H04B 17/18; H04B 7/0695; H04B 17/102; H04L 5/0005; H04L 5/0048; H04L 5/002
See application file for complete search history.

(56) References Cited

U.S. PATENT DOCUMENTS

| | | | |
|---|---|---|---|
| 11,088,744 B1 * | 8/2021 | Hammond | ............ H04W 24/06 |
| 2006/0211369 A1 * | 9/2006 | Steelberg | ......... H04N 21/25891 |
| | | | 455/3.06 |

(Continued)

FOREIGN PATENT DOCUMENTS

| | | |
|---|---|---|
| WO | 2009151361 A1 | 12/2009 |
| WO | 2017190777 A1 | 11/2017 |

(Continued)

OTHER PUBLICATIONS

TSG RAN WG4: "LS response on Test methods for Over-the-Air Total Radiated Power field measurements for IMT radio equipment utilizing active antennas", 3GPP Draft; R4-1916211; F-06921 Sophia-Antipolis Cedex; France, no. Reno, NV, USA; Nov. 18, 2019-Nov. 22, 2019 Dec. 4, 2019 (Dec. 4, 2019), XP051837318 (Year: 2019).*

(Continued)

*Primary Examiner* — Lan-Huong Truong
(74) *Attorney, Agent, or Firm* — Rothwell, Figg, Ernst & Manbeck. P.C.

(57) ABSTRACT

There is provided mechanisms for enabling OTA estimation of a radio frequency parameter of a radio transmitter during a test time interval. The radio transmitter is configured for transmission in a set of beams. A method is performed by a controller of the radio transmitter. The method comprises identifying a subset of beams in the set of beams that, during the test time interval, are unused for transmission of scheduled signals. The method comprises instructing the radio transmitter to transmit, during the test time interval, an unscheduled signal in the subset of beams, whilst also
(Continued)

S102
Identify subset of beams that are unused for transmission of scheduled signals

S104
Instruct radio transmitter to transmit unscheduled signal in identified subset of beams transmitting the scheduled signals in those beams of the set of beams that are used for transmission of the scheduled signals, for enabling estimation of the radio frequency parameter of the radio transmitter.

20 Claims, 7 Drawing Sheets

(52) U.S. Cl.
CPC .......... *H04L 5/0005* (2013.01); *H04L 5/0048* (2013.01); *H04W 72/12* (2013.01)

(56) References Cited

U.S. PATENT DOCUMENTS

| | | | | |
|---|---|---|---|---|
| 2008/0070510 A1* | 3/2008 | Doppler | ............... | H04B 17/345 |
| | | | | 455/69 |
| 2019/0174538 A1* | 6/2019 | Frenger | ................. | H04W 74/08 |
| 2020/0112927 A1* | 4/2020 | Han | .................... | H04W 52/367 |
| 2020/0344776 A1* | 10/2020 | Sen | ....................... | H04W 72/12 |

FOREIGN PATENT DOCUMENTS

| | | |
|---|---|---|
| WO | 2018172451 A1 | 9/2018 |
| WO | 2021037354 A1 | 3/2021 |

OTHER PUBLICATIONS

International Search Report and the Written Opinion of the International Searching Authority, issued in corresponding International Application No. PCT/EP2020/067543, dated Mar. 11, 2021, 9 pages.

TSG RAN WG4 "Ls response on Test methods for Over-the-Air Total Radiated Power field measurements for IMT radio equipment utilizing active antennas" 3GPP TSG WG4 Meeting #93 R4-1916211, Reno, NV, USA, Nov. 18-22, 2019, 4 pages.

Lin et al. "5G New Radio: Unveiling the Essentials of the Next Generation Wireless Access Technology" ResearchGate 2018, 9 pages.

* cited by examiner

OTA ESTIMATION OF AN RF PARAMETER OF A RADIO TRANSMITTER

CROSS REFERENCE TO RELATED APPLICATION(S)

This application is a 35 U.S.C. § 371 National Phase Entry Application of PCT/EP2020/067543, filed Jun. 23, 2020, designating the United States, the disclosure of which is incorporated herein by reference in its entirety.

TECHNICAL FIELD

Embodiments presented herein relate to a method, a controller, a computer program, and a computer program product for enabling over-the-air (OTA) estimation of a radio frequency parameter of a radio transmitter.

BACKGROUND

Some newly developed base stations and other radio equipment are equipped with so-called advanced antenna systems (AAS). These antenna systems increase the capacity and/or coverage compared to traditionally used antenna systems by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the equivalent power radiated from an antenna with unity antenna gain in all directions, is increased as compared to the situation without AAS systems.

In base stations with AAS there is typically either only limited access to the Antenna Reference Point (ARP; sometimes denoted a transceiver array boundary (TAB) connector) or no access at all to the ARP. Hence, it could be difficult, or even impossible, to carry out conducted measurements found in conformance test requirements included in traditional specifications. OTA testing may therefore be the only practical way of verifying RF characteristics, such as radiated transmit power, total radiated power (TRP), and radiated unwanted emission, of base stations with AAS.

In specifications 3GPP TS370.105 entitled "Active Antenna System (AAS) Base Station (BS) transmission and reception", Release 15, and 3GPP TS 38.104 entitled "NR; Base Station (BS) radio transmission and reception", Release 15, have been specified OTA requirements. One goal of these specifications is to allow for a base station having an integrated AAS without access to traditional RF connectors to be compliant for deployment. To capture the dynamic behavior of an AAS, requirements, such as output power, have been defined based on total radiated power as a metric.

However, some of the existing procedures may present technical challenges, such as long testing time, detection of low signal levels etc. Adopting these procedures in a live network, especially without interfering with the normal traffic, could be challenging.

Hence, there is still a need for improved ways to verify that base stations and other radio equipment are compliant in terms of total radiated power, etc.

SUMMARY

An object of embodiments herein is to provide efficient OTA estimation of an RF parameter of a radio transmitter.

According to a first aspect there is presented a method for enabling OTA estimation of a radio frequency parameter of a radio transmitter during a test time interval. The radio transmitter is configured for transmission in a set of beams. The method is performed by a controller of the radio transmitter. The method comprises identifying a subset of beams in the set of beams that, during the test time interval, are unused for transmission of scheduled signals. The method comprises instructing the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

According to a second aspect there is presented a controller of a radio transmitter for enabling OTA estimation of a radio frequency parameter of the radio transmitter during a test time interval. The radio transmitter is configured for transmission in a set of beams. The controller comprises processing circuitry. The processing circuitry is configured to cause the controller to identify a subset of beams in the set of beams that, during the test time interval, are unused for transmission of scheduled signals. The processing circuitry is configured to cause the controller to instruct the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

According to a third aspect there is presented a controller of a radio transmitter for enabling OTA estimation of a radio frequency parameter of the radio transmitter during a test time interval. The radio transmitter is configured for transmission in a set of beams. The controller comprises an identify module configured to identify a subset of beams in the set of beams that, during the test time interval, are unused for transmission of scheduled signals. The controller comprises an instruct module configured to instruct the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

According to a fourth aspect there is presented a computer program for enabling OTA estimation of a radio frequency parameter of a radio transmitter, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects enable efficient OTA estimation of an RF parameter of a radio transmitter.

Advantageously these aspects enable OTA in-the-field testing for verifying output power and emission while the radio transmitter is in normal operation, and without impacting or disturbing the normal operation of the radio transmitter.

Advantageously these aspects enable the test time to be significantly reduced since fewer test locations and measurements are required.

Advantageously these aspects enable the transmitted power to be spatially spread, improving the measurement uncertainty.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
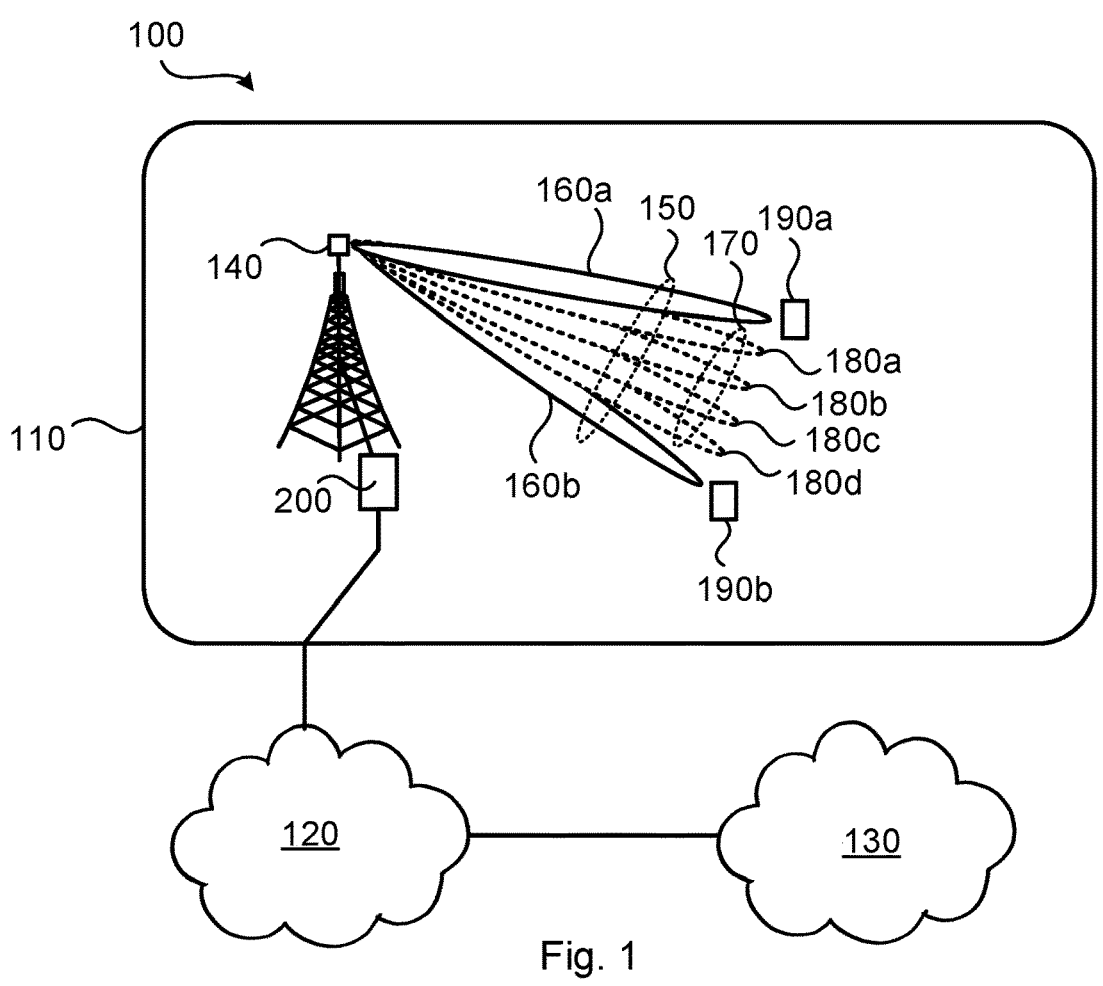
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a controller 200 configured to control network access to terminal devices, as represented by terminal devices 190a, 190b, in a (radio) access network 110. The (radio) access network 110 is operatively connected to a core network 120. The core network 120 is in turn operatively connected to a service network 130, such as the Internet. The terminal devices 190a, 190b are thereby enabled to, via the controller 200, access services of, and exchange data with, the service network 130.

The controller 200 comprises, is collocated with, is integrated with, or is in operational communications with, a radio transmitter 140. In some embodiments, the radio transmitter 140 is part of a (radio) access network node. The controller 200 (via its radio transmitter 140) and the terminal devices 190a, 190b are configured to communicate with each other in a set of beams 150. In this respect, beams that could be used both as transmission beams and reception beams will hereinafter simply be referred to as beams. In the illustrative example, terminal device 190a is served by beam 160a, and terminal device 190b is served by beam 160b. Beams 180a, 180b, 180c, 180d thus define a subset 170 of unused beams. Although beams 180a, 180b, 180c, 180d in FIG. 1 are illustrated as being placed between beams 160a, 160b (and beams 160a, 160b might thus represent edge beams) beams 180a, 180b, 180c, 180d can be placed outside and/or between beams 160a, 160b, depending on the spatial locations of the terminal devices 190a, 190b.

Examples of controllers 200 are radio base stations, base transceiver stations, Node Bs, evolved Node Bs, gNBs, access points, access nodes, and backhaul nodes. Examples of terminal devices 190a, 190b are user equipment, wireless devices, mobile stations, mobile phones, handsets, wireless local loop phones, smartphones, laptop computers, tablet computers, network equipped sensors, network equipped vehicles, and so-called Internet of Things devices.

As noted above there is still a need for improved ways to verify that base stations and other radio equipment, such as the radio transmitter 140, are compliant in terms of total radiated power, etc.

In this respect, one option to measure the total radiated power is for the terminal devices 190a, 190b, or dedicated test equipment, to measure received power levels at many positions within the coverage area of the radio transmitter 140, thereby enabling the full sphere pattern of the radio transmitter 140 to be derived. Such a procedure might be efficiently carried out in a shielded antenna test range but is most likely prohibitively difficult out in field where the radio transmitter 140 is to be deployed, or even has been deployed.

Further in this respect, for in-the-field emission measurements the beamforming for the wanted signal and emission is not known and highly dynamic. This means that to be able to measure EIRP, TRP, or other parameter in field, multiple measurements are required to estimate an accurate value. Also, for emission, the emission beamforming is not constant over frequency. Hence, as TRP requires sampling of power density on a closed surface in a multitude of points, it might be impossible to retrieve TRP of a given beam before the radiation patterns has changed.

Still further in this respect, by using a specially scheduled test signal, the emission behavior may not be the same as for normal network operation. Also, when a scheduled test signal is used, normal network operation may be interrupted or degraded.

The embodiments disclosed herein therefore relate to mechanisms for enabling OTA estimation of a radio frequency parameter of a radio transmitter. In order to obtain such mechanisms there is provided a controller 200, a method performed by the controller 200, a computer program product comprising code, for example in the form of a computer program, that when run on a controller 200, causes the controller 200 to perform the method.

Figure 2:
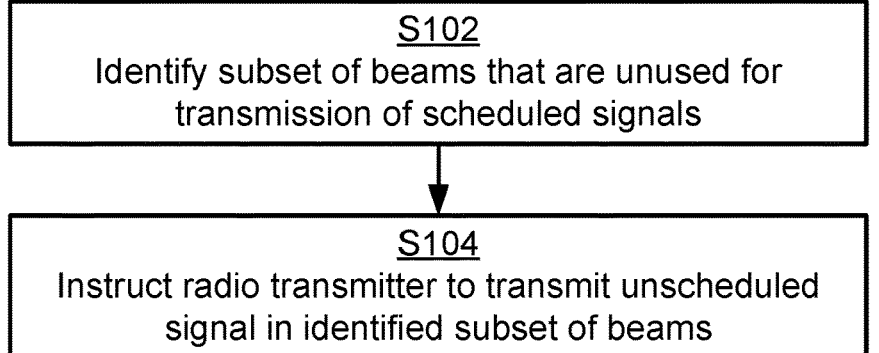
FIG. 2 is a flowchart of methods according to embodiments.

FIG. 2 is a flowchart illustrating embodiments of methods for enabling OTA estimation of a radio frequency parameter of a radio transmitter 140 during a test time interval, wherein the radio transmitter 140 is configured for transmission in a set of beams iso. The methods are performed by the controller 200 of the radio transmitter 140. The methods are advantageously provided as computer programs 320.

S102: The controller 200 identifies a subset of beams 170 in the set of beams 150 that, during the test time interval, are unused for transmission of scheduled signals.

S104: The controller 200 instructs the radio transmitter 140 to transmit, during the test time interval, an unscheduled signal in the subset of beams 170, whilst also transmitting the scheduled signals in those beams 160a, 160b of the set of beams 150 that are used for transmission of the scheduled signals, for enabling estimation of the radio frequency parameter of the radio transmitter 140.

The transmitted power is, with respect to the combination of the scheduled signals and the unscheduled signal, spread in a more uniform way (in frequency, time and space) and OTA in-the-field test of RF parameters can be significantly simplified. Instead of measuring power density at many locations, the in-the-field test operator can measure the power density at a few locations within the coverage area and the outcome of the measurement is less dependent on the position of the tester with respect to the radio transmitter 140. When the radiated power is spread spatially, fewer measurement samples are required to measure TRP accurately.

In the case where there are no free resources, e.g. when all available time/frequency resource are continuously allocated for scheduled traffic and/or other types of scheduled signals, the beams are already spread in different directions and the total power can easily be measured as an average over a few test samples. If there is no traffic at all, the transmission of unscheduled signals would create a radiation pattern similar to the pattern generated from live traffic where terminal devices 190a, 190b are located uniformly in the coverage region of the radio transmitter 140.

Embodiments relating to further details of enabling OTA estimation of a radio frequency parameter of a radio transmitter as performed by the controller 200 will now be disclosed.

There could be different examples of radio frequency parameters that are tested. In some embodiments, the radio frequency parameter pertains to total radiated power (TRP) as used by the radio transmitter 140 for transmission during the time test interval.

The unscheduled signal might be regarded as transmitted when a test mode is enabled. In some aspects the test mode can be selectively enabled and disabled. That is, in some embodiments, whether or not to transmit the unscheduled signal in the subset of beams 170 during the test time interval is selectively enabled and disabled. In some aspects, the test mode is enabled and/or disabled within the communication network 100. The test mode can be enabled and disabled to save power when OTA testing is not conducted. The test mode can be enabled at specific test occasions following a pre-defined calendar. During normal operation the test mode is not enabled.

For an in-the-field OTA test campaign, the tester needs to have access of the control of the test mode. Since the test mode can be used by network operators during the tuning of the communication network 100 and by regulations to verify that transmission license conditions are fulfilled, means to control the function from inside the communication network 100 and outside might be required. In particular, in some embodiments, wherein whether to enable or disable transmission of the unscheduled signal is dependent on a network control signal as received by the controller 200. In other aspects, the test mode is enabled and/or disabled by a measurement equipment, such as a terminal device. In particular, in some embodiments, whether to enable or disable transmission of the unscheduled signal is dependent on a network-external control signal as received by the controller 200. From inside the communication network 100, the test mode can be enabled by having access to the base station local operational and maintenance interface or via the core network 120. To enable the test functionally from the outside of the communication network 100 requires means to authenticate terminal devices 190a, 190b used by regulatory. Only trusted terminal devices 190a, 190b will be able to enable the test function.

In some aspects, the unscheduled signal that in step S104 is transmitted in the otherwise unused subset of beams 170 represents a test signal. Further aspects of the unscheduled signal will now be disclosed. In some embodiments, the unscheduled signal is constituted by a time/frequency component and a spatial component. In this respect, the time/frequency component might be defined by a block of time/frequency resources (or resource elements; REs) in a time/frequency grid. This block of time/frequency resources might otherwise be unused for transmission of the scheduled signals during the test time interval (and hence be available for the unscheduled signal). Available but unused time/frequency REs might thus be used for the test signal. Further in this respect, the spatial component might be defined by the subset of beams 170 in which the unscheduled signal is transmitted. Available but unused beams might thus be used for the test signal. Test beams might thus be added in unused directions using unused time/frequency REs for transmission of the test signal without impacting transmission of scheduled signals.

Still further, the unscheduled signal might be a reference signal or a dedicated test signal. That is, in some embodiments, the unscheduled signal is either a reference signal or a dedicated test signal. The dedicated signal might be defined by a unique sequence of symbols or a randomly selected sequence of symbols. That is, in some embodiments, the dedicated test signal is composed of either a predetermined sequence of symbols or a randomly selected sequence of symbols. Examples of reference signals will be provided below.

The subset of beams 170 can thus be allocated with reference signals to simplify the testing. The controller 200

(or scheduler) needs to track the reference signals allocated for test purposes to differentiate from reference signals used for normal traffic. One reason to have reference signals as unscheduled signals in the subset of beams 170 is that the field test equipment might be configured to measure reference signal power and reference signal signal to noise ratio (SNR), etc. with increased measurement accuracy and reliability. From the reference signal power the carrier power can be evaluated for a fully loaded carrier.

In some aspects, the unscheduled signal is in step S104 also transmitted in beams used for normal traffic. That is, in some embodiments, the unscheduled signal, during the test time interval, is also transmitted in the beams 160a, 160b in which the scheduled signals are transmitted. The unscheduled signal might then be transmitted in any unused time/frequency resources in the time/frequency grid. The unscheduled signal can thereby be transmitted in unused time/frequency resources e.g. to fill up all available time/frequency resources.

Figure 3:
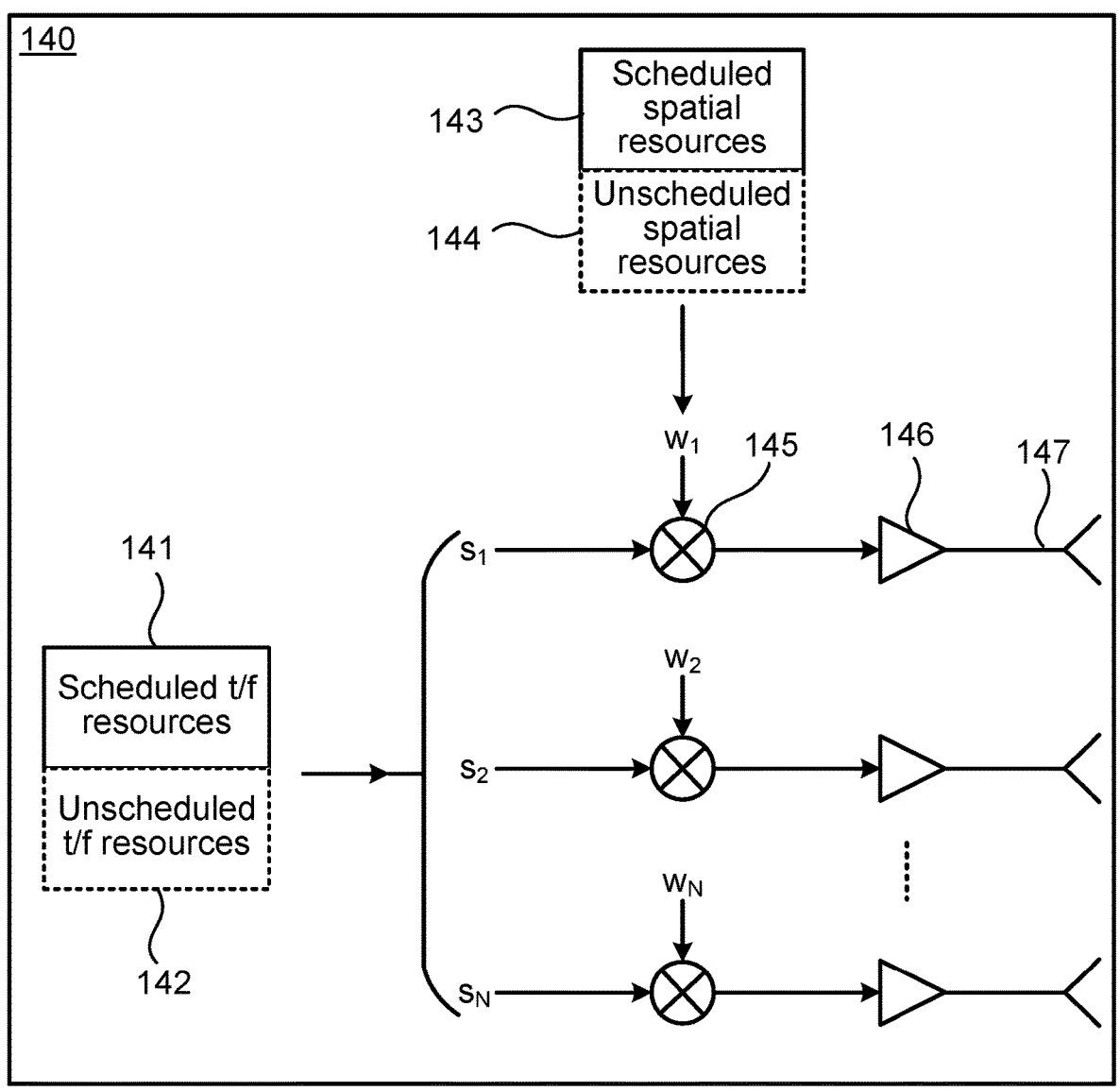
FIG. 3 schematically illustrates a radio transmitter according to an embodiment.

During the test mode, available time/frequency resources in the resource grid might thus be utilized to spread power spatially within the coverage region. The time/frequency resources allocated to testing might be referred to as defining the test signal, which is added on the ordinary resource allocating required for normal traffic. Reference is here made to FIG. 3 that schematically illustrates the radio transmitter 140 where a test signal is added to scheduled signals. Assume that scheduled time/frequency resources 141 are to be transmitted on scheduled spatial resources 143 (such as beams) and that unscheduled time/frequency resources 142 are to be transmitted on unscheduled spatial resources 144 (such as beams). The test signal is constituted by a time/frequency component (sn) and a spatial component (wn). For the test signal, the signal consists of a unique code or sequence of symbols (e.g. corresponding to a reference signals) or random data. The signal wn is selected to spread power within a specific area mapping towards the selected test locations. Hence, the signal wn defines beam weights. In the illustrative example of FIG. 3, each time/frequency component of the signal is at combiner 145 weighted by the spatial component of that signal, amplified at power amplifier 146 and transmitted at antenna 147. Operation of the radio transmitter 140 is controlled by the controller 200 (not shown in FIG. 3).

The beam weights wn can be selected to generate a grid of narrow beams, wide beams using array size invariant dual polarized beamforming or beams optimized to fill in between scheduled terminal devices 190a, 190b. There could thus be different types of beams in the set of beams 150 as well in the subset of beams 170. In some embodiments, the set of beams 150 is defined by a fixed grid of beams (GoB). The subset of beams 170 are then also defined by a fixed GoB. In some examples, the set of beams 150 provides uniform coverage within a coverage region e.g. enabling signals to be transmitted in beams that span the coverage region. Therefore, in some embodiments, the beams 160a, 160b, 180a, 180b, 180c, 180d in the set of beams 150 have pointing directions that are uniformly distributed within the coverage region. In other examples, at least the beams 180a, 180b, 180c, 180d in the subset of beams 170 are generated using random-valued (or pseudo-random-valued) beam weights that implies that the pointing directions of the beams are more or less random; but these beams 180a, 180b, 180c, 180d in the subset of beams 170 should still be within the coverage region and not overlap with the beams 160a, 160b used for normal traffic. That is, in some embodiments, beams 180a, 180b, 180c, 180d in the subset of beams 170 are only bounded by being within the coverage region and having pointing directions that do not overlap with pointing directions of beams 160a, 160b in which scheduled signals are transmitted within the test time interval. In yet other examples, there can be one single wide beam in the subset of beams 170 instead of several narrow beams. In particular, in some embodiments, the subset of beams 170 in which the unscheduled signal is transmitted comprises either one single beam or at least two beams, where each of the at least two narrow beams has a more narrow beam width than the one single beam.

Figure 4:
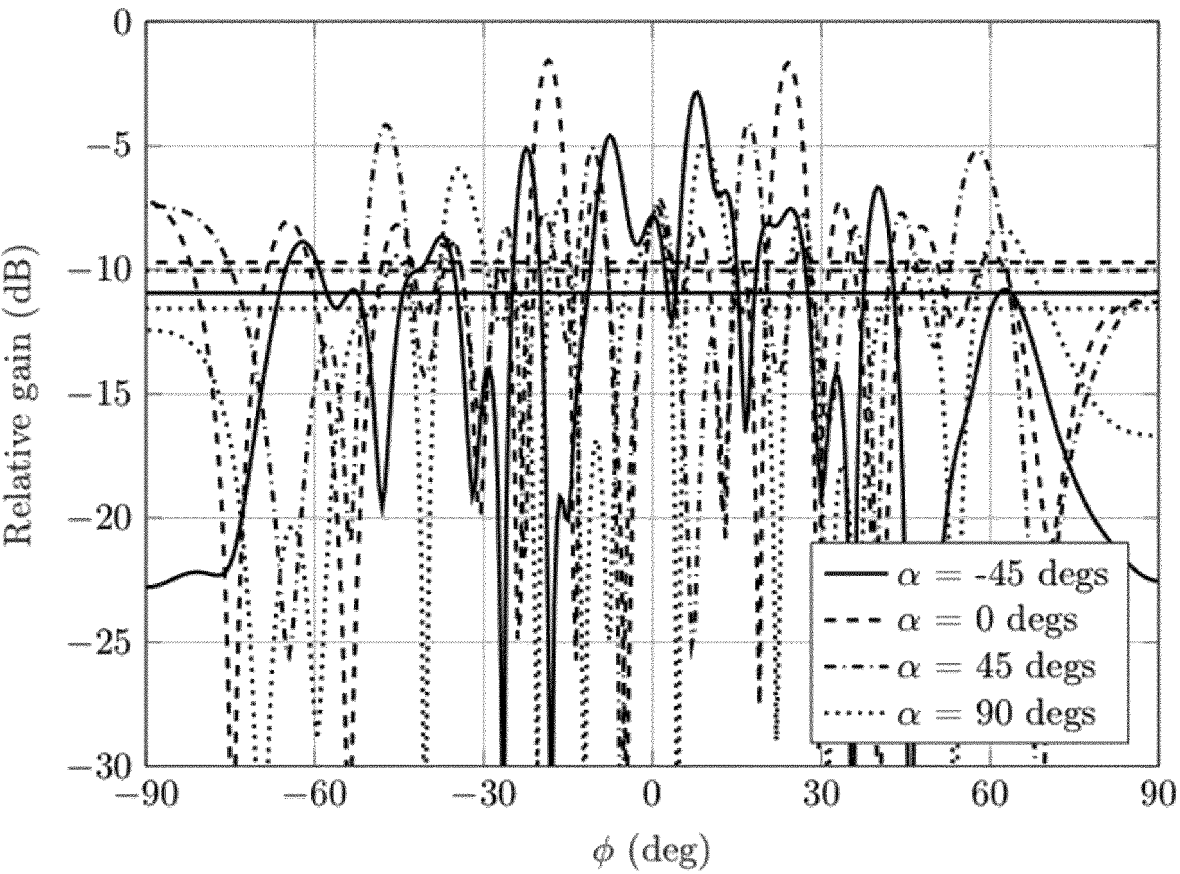
FIG. 4 schematically illustrates radiation pattern according to an embodiment.

FIG. 4 illustrates the total radiation pattern resulting from spatially spreading the power. Such a hedgehog-like radiation pattern, although not perfectly uniform, is highly independent of orientation. This means that no matter from which direction the radiation pattern is observed, it will have the same appearance. As a result, this radiation pattern only needs to be measured with limited number of measurement samples in a limited angular region to enable accurate calculation of the statistics of the radiation pattern, such as TRP (which is the average of the EIRP pattern). This eliminates the need for full-sphere measurements or measurements on very specific spatial grids.

There could be different ways to identify which beams 180a, 180b, 180c, 180d should be part of the subset of beams 170. In some aspects, the unused beams are identified by tracking those beams where reference signals are transmitted and then transmitting the unscheduled signal in those beams where no reference signal are transmitted. Particularly, in some embodiments, the subset of beams 170 is identified as those beams 180a, 180b, 180c, 180d of the set of beams 150 in which no scheduled reference signals are transmitted. There could be different types of reference signals. In some non-limiting examples, the reference signal is a synchronization signal block (SSB) signal.

Figure 5:
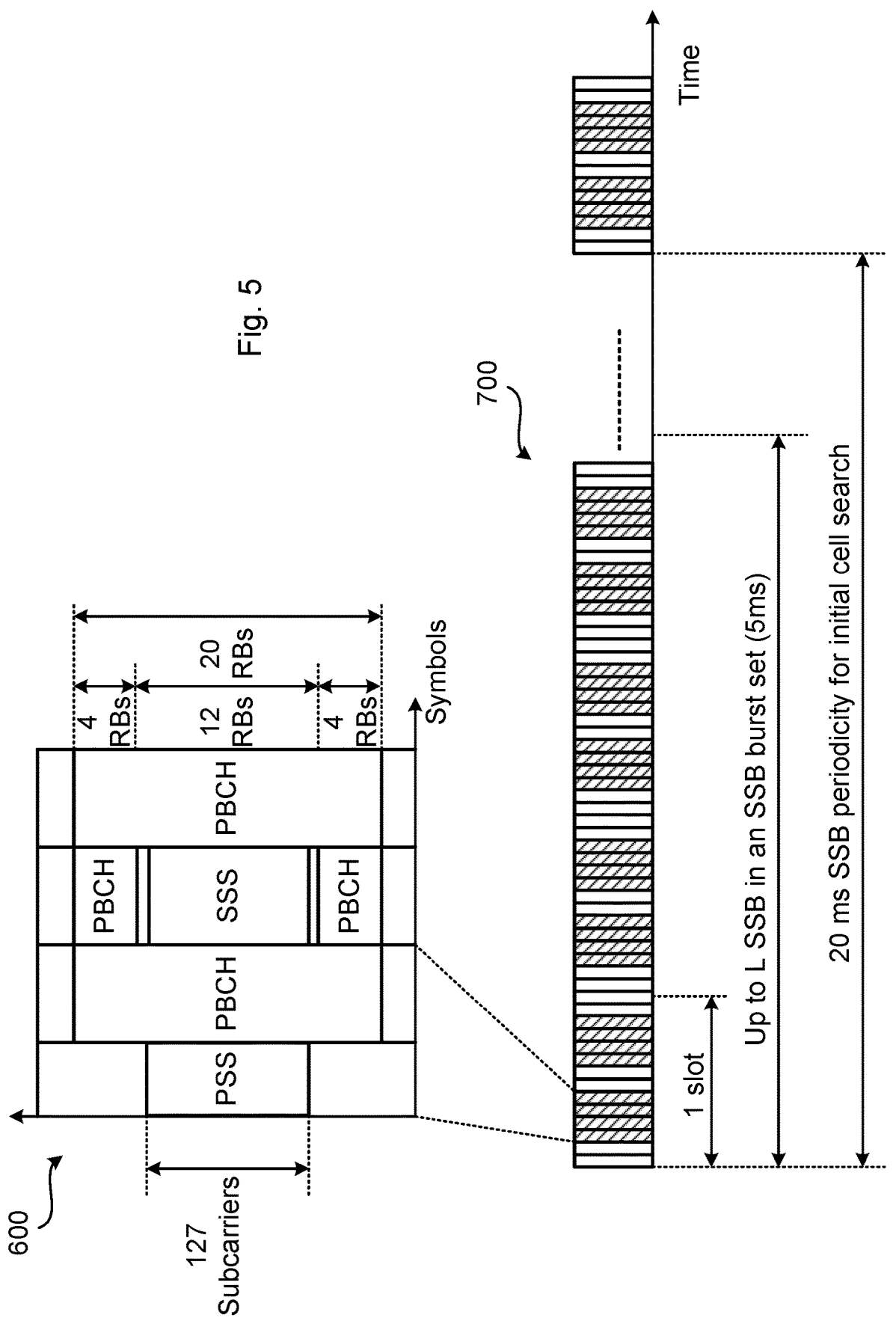
FIG. 5 schematically illustrates an SSB according to an embodiment.

FIG. 5 illustrates at 600 and 700 the structure of an SSB and the transmission of SSBs along a time axis, respectively. The SSB comprises a primary synchronization signal (PSS), a secondary synchronization signal (SSS), and a physical broadcast channel (PBCH), with resource blocks (RBs) as indicated in the figure.

Figure 6:
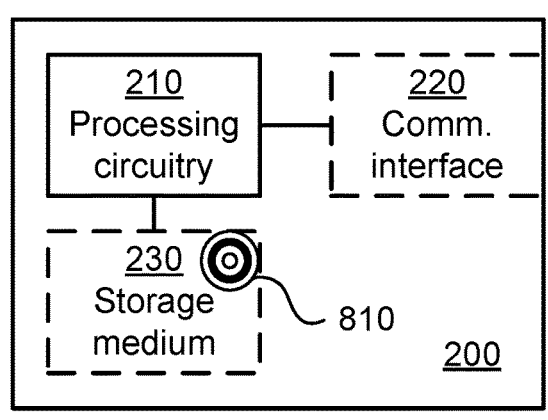
FIG. 6 is a schematic diagram showing functional units of a controller according to an embodiment.

FIG. 6 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with other entities, functions, nodes, and devices of the communication network 100. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 7:
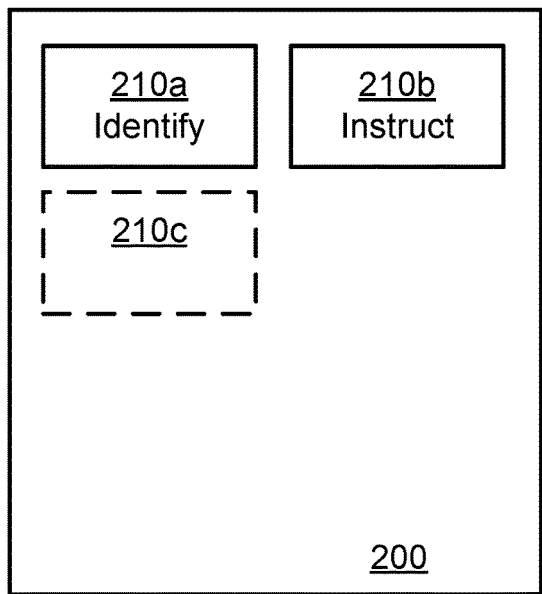
FIG. 7 is a schematic diagram showing functional modules of a controller according to an embodiment.

FIG. 7 schematically illustrates, in terms of a number of functional modules, the components of a controller 200 according to an embodiment. The controller 200 of FIG. 7 comprises a number of functional modules; an identify module 210*a* configured to perform step S102, and an initiate module 210*b* configured to perform step S104. The controller 200 of FIG. 7 may further comprise a number of optional functional modules, as represented by functional module 210C. In general terms, each functional module 210*a*-210*c* may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210*a*-210C may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*c* and to execute these instructions, thereby performing any steps as disclosed herein.

The controller 200 may be provided as a standalone device or as a part of at least one further device. For example, the controller 200 may be provided in a node of the radio access network or in a node of the core network. Alternatively, functionality of the controller 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 6 the processing circuitry 210 may be distributed among a plurality of devices, or nodes. The same applies to the functional modules 210*a*-210*c* of FIG. 7 and the computer program 320 of FIG. 8.

Figure 8:
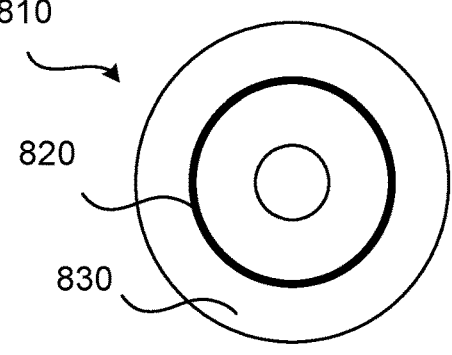
FIG. 8 shows one example of a computer program product comprising computer readable storage medium according to an embodiment.

FIG. 8 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 8, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 9:
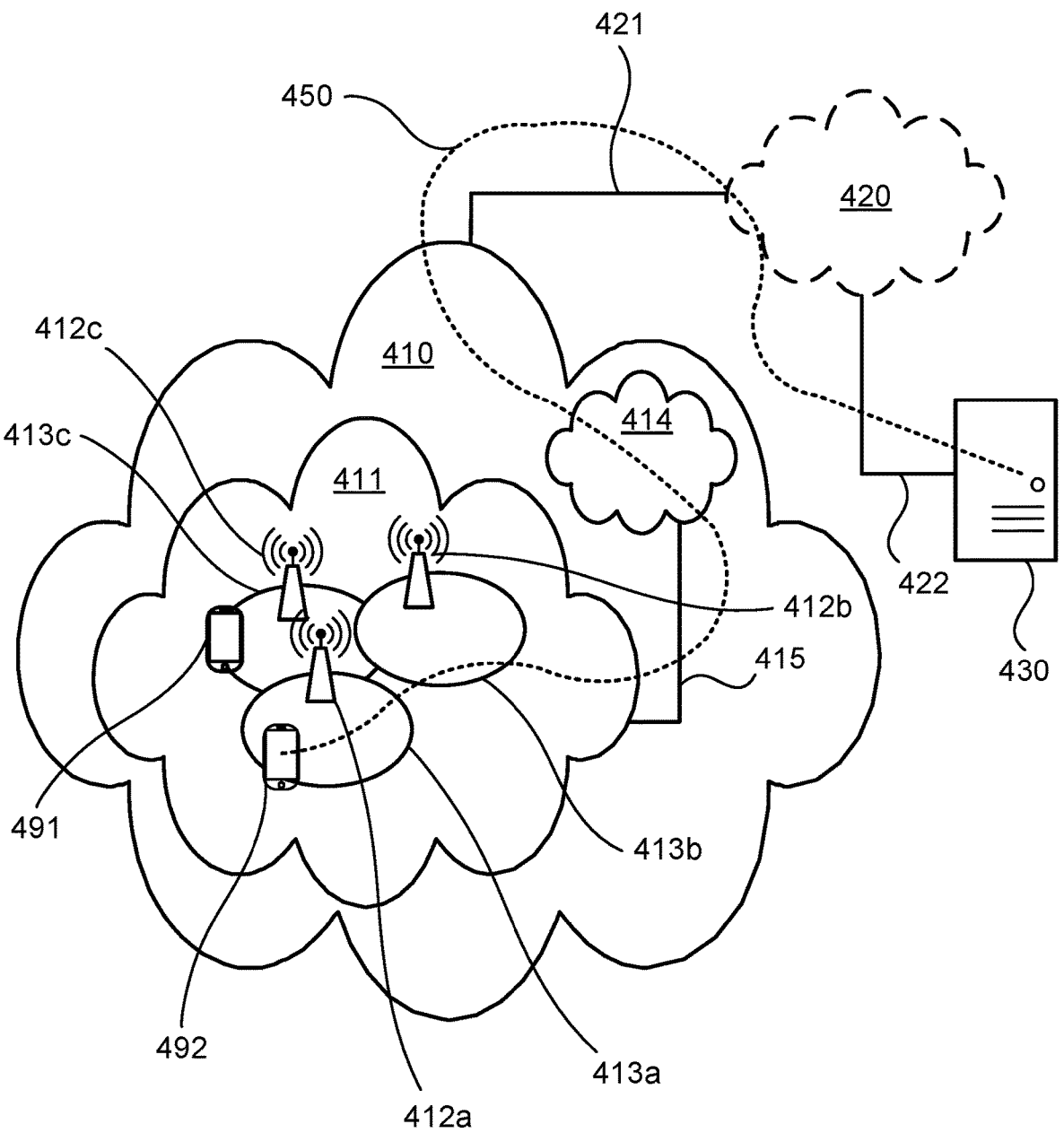
FIG. 9 is a schematic diagram illustrating a telecommunication network connected via an intermediate network to a host computer in accordance with some embodiments.

FIG. 9 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network no in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the controller 200 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 190*a*, 190*b* of FIG. 1.

Telecommunication network 410 is itself connected to host computer 430, which may be embodied in the hardware and/or software of a standalone server, a cloud-implemented server, a distributed server or as processing resources in a server farm. Host computer 43*o* may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 10:
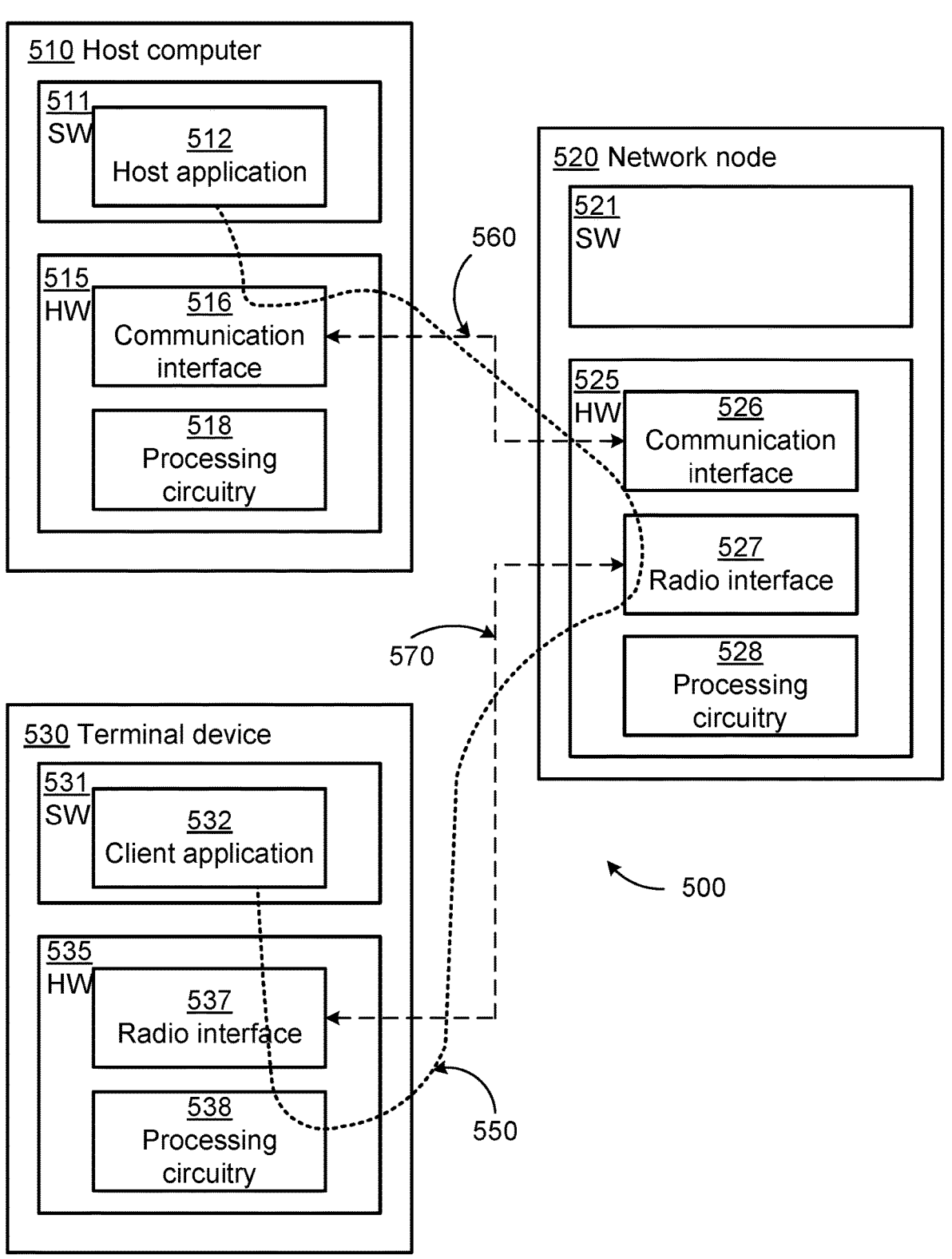
FIG. 10 is a schematic diagram illustrating host computer communicating via a radio base station with a terminal device over a partially wireless connection in accordance with some embodiments.

FIG. 10 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 190a, 190b of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the controller 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by radio access network node 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 10 may be similar or identical to host computer 430, one of network nodes 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results.

The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like.

The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling over-the-air, OTA, estimation of a radio frequency parameter of a radio transmitter during a test time interval, wherein the radio transmitter is configured for transmission in a set of beams, the method being performed by a controller of the radio transmitter, the method comprising:

identifying a subset of beams in the set of beams that, during the test time interval, are unused for transmission of scheduled signals; and instructing the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

2. The method according to claim 1, wherein the unscheduled signal is constituted by a time/frequency component and a spatial component.

3. The method according to claim 2, wherein the time/frequency component is defined by a block of time/frequency resources in a time/frequency grid.

4. The method according to claim 3, wherein the block of time/frequency resources are unused for transmission of the scheduled signals during the test time interval.

5. The method according to claim 2, wherein the spatial component is defined by the subset of beams in which the unscheduled signal is transmitted.

6. The method according to claim 1, wherein the unscheduled signal, during the test time interval, is also transmitted in the beams in which the scheduled signals are transmitted.

7. The method according to claim 6, wherein the scheduled signals are transmitted in time/frequency resources of a time/frequency grid, and wherein the unscheduled signal is transmitted in any unused time/frequency resources in the time/frequency grid.

8. The method according to claim 1, wherein the set of beams is defined by a fixed grid of beams.

9. The method according to claim 1, wherein the beams in the set of beams have pointing directions that are uniformly distributed within the coverage region.

10. The method according to claim 1, wherein beams in the subset of beams are only bounded by being within the coverage region and having pointing directions that do not overlap with pointing directions of beams in which scheduled signals are transmitted within the test time interval.

11. The method according to claim 1, wherein the subset of beams in which the unscheduled signal is transmitted comprises either one single beam or at least two beams, wherein each of the at least two narrow beams has a more narrow beam width than the one single beam.

12. The method according to claim 1, wherein the subset of beams is identified as those beams of the set of beams in which no scheduled reference signals are transmitted.

13. The method according to claim 1, wherein the unscheduled signal is either a reference signal or a dedicated test signal.

14. The method according to claim 13, wherein the dedicated test signal is composed of either a predetermined sequence of symbols or a randomly selected sequence of symbols.

15. The method according to claim 1, wherein whether or not to transmit the unscheduled signal in the subset of beams during the test time interval is selectively enabled and disabled.

16. The method according to claim 15, wherein whether to enable or disable transmission of the unscheduled signal is dependent on a network control signal as received by the controller or a network-external control signal as received by the controller.

17. The method according to claim 1, wherein the radio frequency parameter pertains to total radiated power as used by the radio transmitter for transmission during the time test interval.

18. The method according to claim 1, wherein the radio transmitter is part of a radio access network node.

19. A controller of a radio transmitter for enabling over-the-air, OTA, estimation of a radio frequency parameter of the radio transmitter during a test time interval, wherein the radio transmitter is configured for transmission in a set of beams, the controller comprising processing circuitry, the processing circuitry being configured to cause the controller to:

identify a subset of beams in the set of beams that, during the test time interval, are unused for transmission of scheduled signals; and instruct the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

20. A non-transitory computer readable medium comprising a computer program for enabling over-the-air, OTA, estimation of a radio frequency parameter of a radio transmitter during a test time interval, wherein the radio transmitter is configured for transmission in a set of beams, the computer program comprising computer code which, when run on processing circuitry of a controller of the radio transmitter, causes the controller to:

identify a subset of beams in the set of beams that, during the test time interval, are unused for transmission of scheduled signals; and instruct the radio transmitter to transmit, during the test time interval, an unscheduled signal in the subset of beams, whilst also transmitting the scheduled signals in those beams of the set of beams that are used for transmission of the scheduled signals, for enabling estimation of the radio frequency parameter of the radio transmitter.

\* \* \* \* \*